US006377574B1

(12) United States Patent
Endo

(10) Patent No.: US 6,377,574 B1
(45) Date of Patent: Apr. 23, 2002

(54) PACKET SWITCH AND METHOD FOR RELAYING MANAGEMENT CELLS AND DATA CELLS IN A FORM OF IP PACKET

(75) Inventor: Noboru Endo, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/178,539

(22) Filed: Oct. 26, 1998

(30) Foreign Application Priority Data

Oct. 24, 1997 (JP) .............................. 9-292024

(51) Int. Cl.⁷ .......................... H04L 12/50; H04L 12/28
(52) U.S. Cl. ........................................ 370/359; 370/395
(58) Field of Search ............................... 370/392, 395, 370/397, 399, 400, 410, 412, 428, 429, 352, 359

(56) References Cited

U.S. PATENT DOCUMENTS 5,715,250 A * 2/1998 Watanabe .................... 370/395
6,002,668 A   12/1999 Miyoshi et al.
6,014,382 A * 1/2000 Takihiro et al. ............. 370/399
6,108,304 A * 8/2000 Abe et al. .................... 370/232

FOREIGN PATENT DOCUMENTS

JP    4248729    9/1992
JP   08018569    1/1996
JP   08265333   10/1996

* cited by examiner

Primary Examiner—Wellington Chin
Assistant Examiner—Brenda Pham
(74) Attorney, Agent, or Firm—Antonelli, Terry, Stout & Kraus, LLP

(57) ABSTRACT

A packet switch comprising a plurality of line interfaces each connected to a pair of input and output ATM lines, and a routing unit for transferring packets received from each of said line interfaces to one of the other line interfaces specified by the header information of the packets, wherein each of the line interfaces is configured to convert a group of ATM cells received from the input ATM line selectively into either a first type of packet in which ATM cell headers are excluded or a second type of packet in which ATM cell headers are remained, whereby management cells received from the input ATM line are relayed to said one of the other line interface by inserting said management cell into said second type of packet together with user cells on the same connection.

3 Claims, 16 Drawing Sheets

|  | 8 | 7 | 6 | 5 | 4 | 3 | 2 | 1 |
|---|---|---|---|---|---|---|---|---|
| 6 | ID ||||||||
| 7 | MESSAGE TYPE ||||||||
| 8—9 | ER ||||||||
| 10—11 | CCR ||||||||
| 12—13 | MCR ||||||||
| 14—17 | QL ||||||||
| 18—21 | SN ||||||||
| 22—51 | RESERVED (6A(hex)) ||||||||
| 52 | RESERVED (00) ||||||||
| 53 | CRC-10 ||||||||

| 8 | 7 | 6 | 5 | 4 | 3 | 2 | 1 |
|---|---|---|---|---|---|---|---|
| DIR | BN | CI | NI | RA | RESERVED |||

FIG. 12

RECEIVING VC TABLE 60

| VPI/VCI | HEAD FLAG | TERMINATION FLAG | POINTER |
|---|---|---|---|
| 600 | 601 | 602 | 603 |
|  |  |  |  |
|  |  |  |  |

FIG. 13

TERMINATION FLAG 602

| RM | VC AIS | VC RDI | VC LB | VC CC | VC PM |
|---|---|---|---|---|---|
| 604 | 605 | 606 | 607 | 608 | 609 |

FIG. 14

RECEIVING MANAGEMENT TABLE 66

| NEXT PACKET ADDRESS | RECEIVING FLAG | IP HEADER | NUMBER OF CELLS | HEAD POINTER ADDRESS | TAIL POINTER ADDRESS |
|---|---|---|---|---|---|
| 660 / 661 | 663 | 664 | 665 | 666 | 667 |
|  |  |  |  |  |  |
|  |  |  |  |  |  |

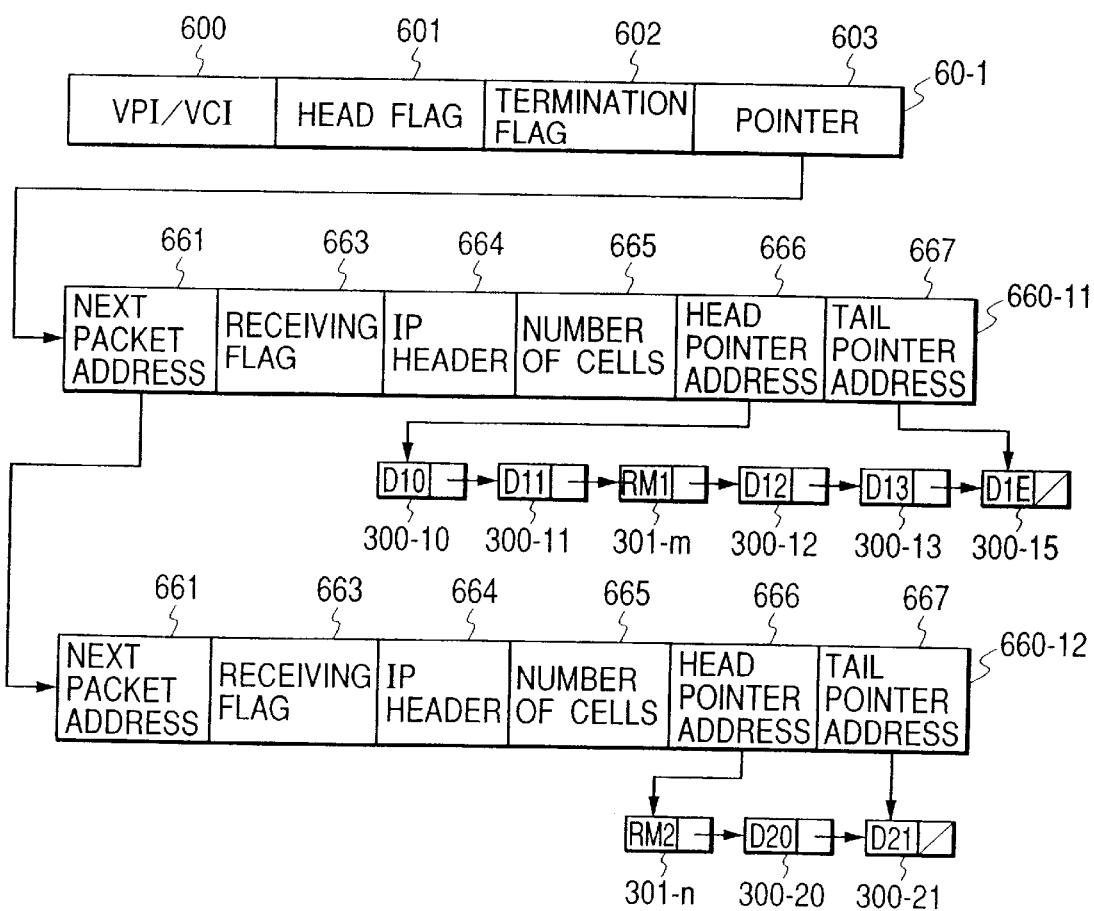

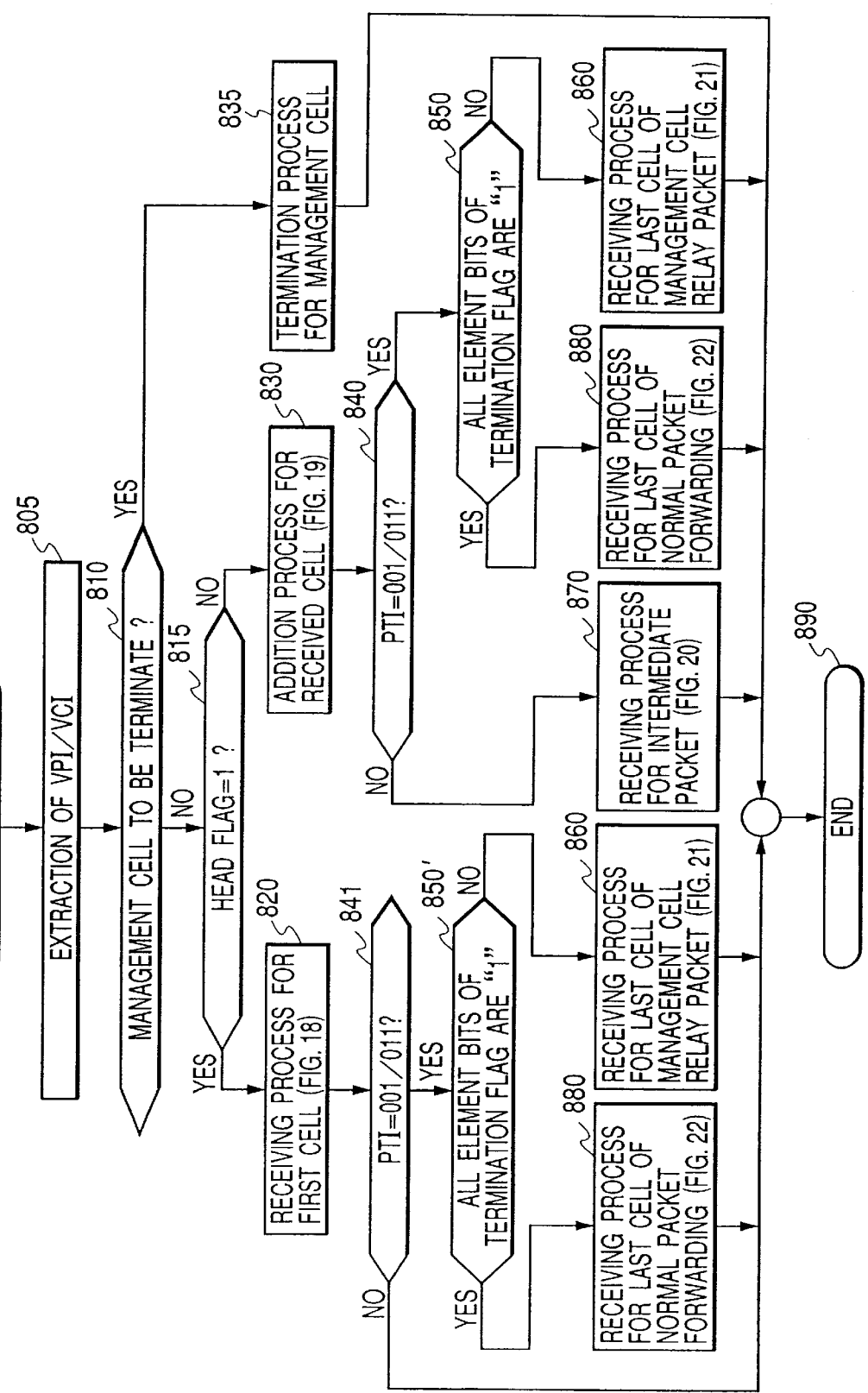

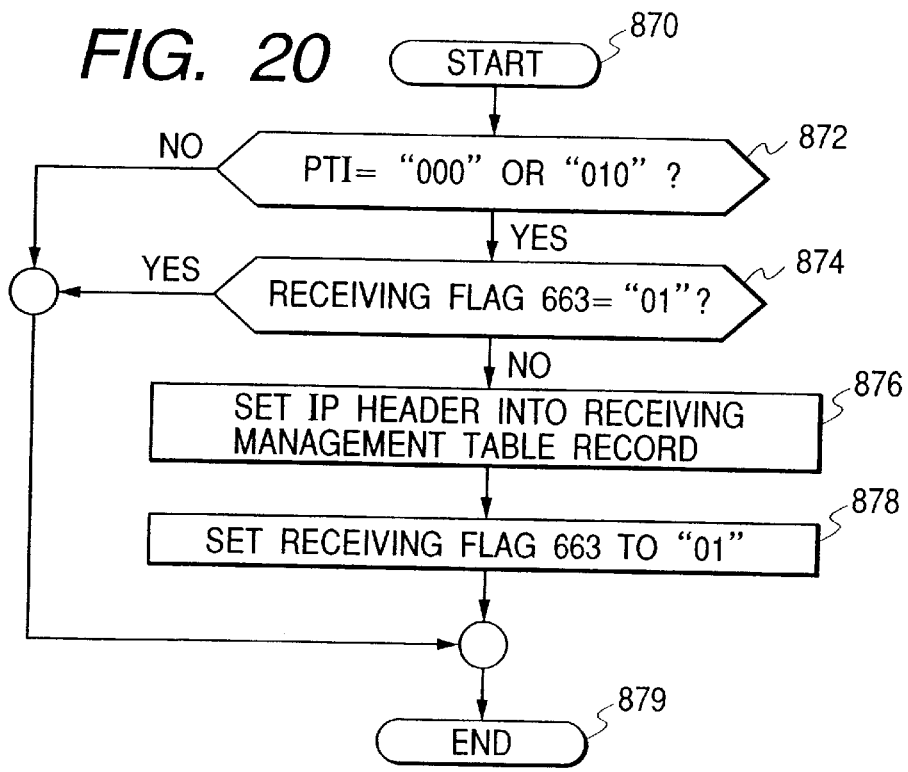
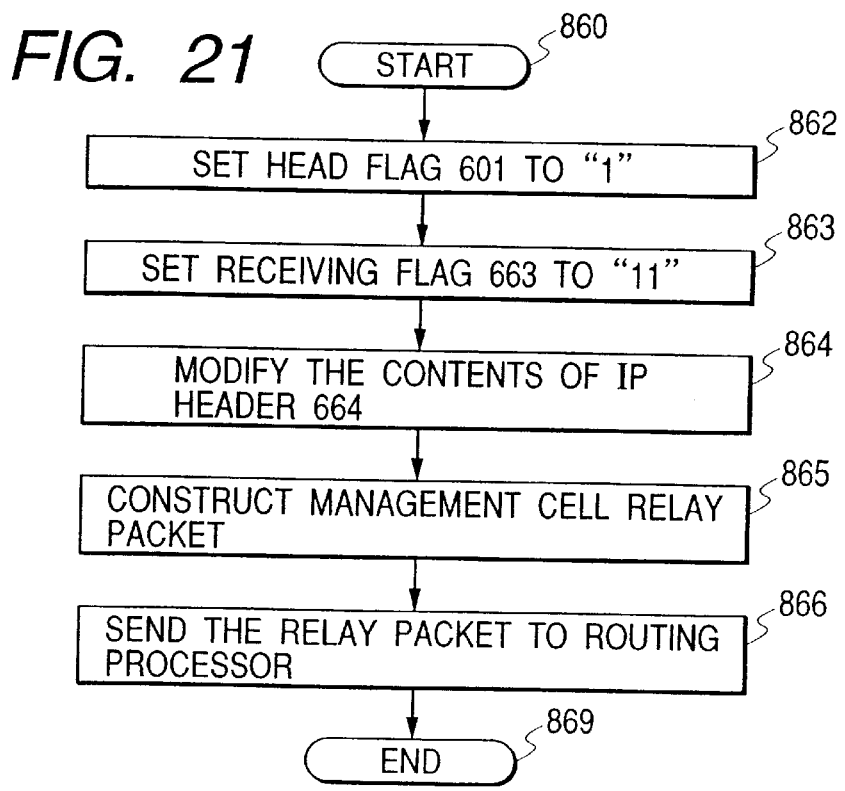

FIG. 26

TRANSMISSION MANAGEMENT TABLE 67

| IP HEADER | HEAD POINTER ADDRESS | TAIL POINTER ADDRESS |
|---|---|---|
| | | |
| | | |
| | | |

TRANSMISSION VC TABLE 68

| SOURCE IP ADDRESS | DESTINATION IP ADDRESS | VPI/VCI | TERMINATION FLAG |
|---|---|---|---|
| | | | |
| | | | |
| | | | |

680, 681, 682, 683, 684

PACKET SWITCH AND METHOD FOR RELAYING MANAGEMENT CELLS AND DATA CELLS IN A FORM OF IP PACKET

BACKGROUND OF THE INVENTION

1. Field of the Invention

The present invention relates to a packet switch, more particularly, a packet switch for transmitting or receiving IP (Internet Protocol) packets from an ATM line or to an ATM line, as well as for exchanging IP packets between ATM lines according to a network layer routing protocol.

2. Description of the Related Art

FIG. 2 shows a packet switch 1a connected to a plurality of ATM terminals 2a, 2c, and another packet switch 1b via ATM lines 3 (3a, 3b, 3c) and 4 (4a, 4b, 4c) respectively. The packet switch is used for relaying IP packets received by each ATM terminal as ATM cells to another ATM line according to a destination address.

The packet switch 1a comprises a routing controller 5 composed of a processor 51 provided with a routing table 52, as well as a plurality of line interfaces 6 (6a to 6c) connected to the routing controller 5 via an internal bus 7. Each ATM terminal 2 (2a to 2b) includes a processor 21, a memory 22, and an ATM interface 23. Reference numerals 3 (3a to 3c) and 4 (4a to 4c) are one-way ATM lines connected to the line interface 6 of the packet switch 1a respectively and used to enter and output ATM cells.

If an IP packet is to be transmitted from an ATM terminal 2a, for example, the processor 21 reads transmission data 110 from the memory 22 and transmits a packet 100 to the ATM interface 23. The packet 100 includes an IP header 120, which is added to the data 110 according to the format of the IP (Internet Protocol) packet shown in FIG. 3, before the processor 21 transmits the packet 100 to the ATM interface 23.

The ATM interface 23 then adds the 8-byte first control information to the start of the packet 100 in the format shown in FIG. 4 according to both IETF (Internet Engineering Task Force) and RFC (Request for Comments), as well as adds the second control information to the end of the user information 200 consisting of the above control information and the packet 100 in the format of the CPCS (Common Part Convergence Sublayer) of the AAL (ATM Adaptation Layer) 5 shown in FIG. 5. The format conforms to the ITU-T (International Telecommunication Union-Telecommunication Standardization Sector) recommendation I.363. The first control information consists of an LLC (Logical Link Control) part 130 including a 1-byte DSAP (Destination Service Access Point) and a 1-byte SSAP (Source Service Access Point); and an SNAP (Subnetwork Attachment Point) part including a 3-byte OUI (Organizationally Unique Identifier) and a 3-byte PID (Protocol Identifier). The second control information consists of a padding field 201 used to adjust a packet length so that a full length of each packet becomes a multiple of 48; a 2-byte reserved field 202; a 2-byte packet length field 203 used to indicate a length of the above user information 200; and a 4-byte CRC field 204.

The ATM interface 23 divides an IP packet to which both first and second control information is added into a plurality of 48-byte information blocks thereby to generate ATM cells 300, each consisting of a 48-byte payload 310 including one of said 48-byte information blocks and a 5-byte ATM cell header 320 in the format shown in FIG. 6. The ATM interface 23 then transfers the generated ATM cells 300 to the ATM line 3a. At this time, the ATM interface assigns a VPI (Virtual Path Identifier) value and a VCI (Virtual Channel Identifier) value for each pair of a source IP address and a destination IP address included in each IP packet header and sets the values in both VPI and VCI fields of the ATM header 320. In the ATM header shown in FIG. 6, the GFC field includes general flow control information used to prevent conflict between cells on a bus when the ATM switch is connected to a LAN, etc. The PTI field includes a payload type indicating a purpose for using the payload 310. The CLP field includes cell loss priority information indicating whether to transfer object cells without a loss. The HEC field includes header error control information.

The ATM interface 23 transmits a management cell every fixed number of data cells (user cells) if the ABR (Available Bit Rate) service is used or if the performance monitoring function of the OAM (Operation, Administration, and Maintenance), which is a network management function group is used.

FIG. 7 shows how a management cell is transmitted when the ABR service is used. A D-box (e.g., 300-2, 300-3, 300-4, 300-6, . . . ) indicates a data cell and an RM-box (e.g., 301-1, 301-5) indicates a resource management cell. Those cells are shown in FIG. 7 from left to right in order of transmission times. In FIG. 7, one resource management cell is transmitted every 3 data cells. The resource management cell (RM cell) has a value "110" set in the PTI (Payload Type Indication) field of the ATM header 320. In the 48 bytes of the payload 310 is included management information in the format shown in FIG. 8.

In FIG. 8, ID indicates a Protocol Identifier. ER stands for Explicit cell Rate, CCR stands for Current Cell Rate, MCR stands for Minimum Cell Rate, QL stands for Queue Length, SN stands for Sequence Number, and CRC stands for Cyclic Redundancy Check respectively. A resource management cell includes control information set in the 7th byte message type field in the format shown in FIG. 9.

In FIG. 9, the DRI is a bit indicating whether an object RM cell is transferred forward or backward. The BN is a bit indicating whether an object RM cell is generated at a source node or at a non-source node. The CI is a bit indicating whether or not a congestion is generated. The NI is a bit indicating whether or not an additive increase is allowed. The RA is a resource allocation bit.

Back to FIG. 2. The line interface 6a, when receiving a cell from the ATM line 3a, checks the PTI field of the received cell ATM header to know whether the received cell is a management cell such as an OAM cell, a resource management cell, etc. If the received cell is a management cell such as an OAM cell, a resource management cell, etc., the line interface 6a takes out the cell from the cell flow and processes the cell as needed. If the received cell is an OAM cell for error management or a resource management cell for ABR service, the line interface 6a processes the cell as needed, then transfers the cell to the ATM line 4a. If the received cell is a data cell, the line interface 6a combines the payloads 310 of a series of received cells to recompose the original IP packet and transmits the IP packet to the routing controller 5 via the internal bus 7.

The processor 51 of the routing controller 5 stores the routing information indicating the correspondence between the destination IP address of the IP packet to be relayed and the output line interface 6 for receiving the IP packet according to, for example, the OSPF (Open Shortest Path First). The processor 51, when receiving an IP packet from the line interface 6a, checks the IP header 120. If the IP header is illegal, the processor 51 discards it. The processor 51 then reduces the value in the field for time to live in the IP header by one only for IP packets having a valid IP header respectively. Then, the processor 51 searches the routing table 52 to find the output line interface 6c corresponding to the destination IP address and transmits the IP packet to the output line interface 6c via the internal bus 7. If an option field is added to the IP header and the value of the first byte in the option field is within 32 to 63, 96 to 127, 160 to 191, or 224 to 255, the processor 51 discards the IP packet received from the line interface 2a.

In the line interface 6c, the processor 51 sets additional information just like in the ATM terminal 2a before or after receiving an IP packet from the routing controller 5, then converts the received IP packet to a plurality of ATM cells and transmits those ATM cells to the output ATM line 4c. Since the output line interface 4c stores VPI and VCI values assigned for output cells beforehand for each pair of source IP address and destination IP address of the IP packet, those assigned VPI and VCI values are set in the VPI and VCI fields of each of the ATM cells.

As described above, in a related art packet switch, a management cell such as an OAM cell, a resource cell, etc. received from an input side ATM line is terminated at the input side line interface 6a and looped back at an ATM terminal which is the source of the IP packet as shown in FIG. 10. A management cell transmitted from an output side line interface 6c to an output ATM line 4c is looped back to the input ATM line 3c at the destination terminal 2b, so that the management cell is returned to the line interface 6c. In other words, in the related art packet switch, a management cell inserted in an ATM cell flow used to transfer IP packet information is not relayed to the destination side line interface via the packet switch. Consequently, it is impossible for each ATM terminal or another ATM switch connected to an input ATM line to know the state of an error and a congestion of the ATM line on the destination IP packet switch. In the same way, the related art packet switch has been confronted with a problem that it is impossible for each ATM terminal or another ATM switch connected to an output ATM line to know the state of an error and a congestion of the ATM line on the IP packet source side.

SUMMARY OF THE INVENTION

Under such the circumstances, it is an object of the present invention to provide a packet switch provided with a plurality of line interfaces connected to an ATM line respectively and usable for relaying each management cell received by a line interface to another line interface.

It is another object of the present invention to provide a packet switch that can relay each management cell received together with data cells coexisting in a data cell flow (or a user cell flow) from an ATM line to another ATM line while keeping a relative positional relationship with the data flow.

It is further another object of the present invention to provide a packet switch that can relay a specific management cell specified for each connection from a line interface to another line interface.

It is further another object of the present invention to provide a communication network enabling a terminal equipment connected to a packet switch via an ATM line to know the state of the ATM line on another terminal equipment side, which is the other party of the communication.

It is further another object of the present invention to provide a method for relaying management cells, used in a packet switch provided with a plurality of line interfaces and enabling each of the line interfaces to convert data cells received from an ATM line to an IP packet and relay the IP packet to a line interface specified with its IP header, as well as each line interface to convert an IP packet received from another line interface to ATM cells to be transmitted to an output ATM line.

In order to achieve the above objects of the present invention, the packet switch of the present invention comprises a plurality of line interfaces each of which is coupled with a pair of input and output ATM lines so as to communicate ATM cells with said input and output ATM lines, and a routing unit coupled with said line interfaces so as to receive data packets from each of said line interfaces and to selectively transfer the received data packets to one of said line interfaces specified by the header information of said data packets, wherein at least two of said line interfaces are configured to selectively convert a group of ATM cells received from said input ATM line associated therewith to one of a first type of data packet in which ATM headers of said ATM cells are removed and a second type of data packet in which ATM headers of said ATM cells are remained and to convert first and second type of data packets received from said routing unit to a group of ATM cells to be transmitted to the output ATM line associated therewith.

More concretely, the first type of data packet comprises a packet header including information to identify the first type packet and an information field in which a series of ATM payloads extracted from sad ATM cells are disposed continuously. The second type of data packet comprises a packet header including information to identify the second type packet and an information field in which a series of ATM cells are disposed continuously. The second type of data packet preferably includes at least one data cell and at least one management cell in its information field.

One feature of the present invention resides in that the packet switch comprises a plurality of line interfaces coupled with a pair of input and output ATM lines respectively and a routing unit for relaying IP (Internet Protocol) packets received from each of the line interfaces to any one of the line interfaces specified by the packet header information of said respective IP packets, and each of the line interfaces is configured to convert a group of ATM cells received from the input ATM line associated therewith to an IP packet and pass the IP packet to said routing unit, to convert an IP packet received from said routing unit to a group of ATM cells and send out the ATM cells to the output ATM line associated therewith, and to selectively incorporate a management cell received from the input ATM line in said IP packet to be passed to said routing unit.

More in detail, said management cell is inserted in an IP packet together with a group of data cells, which belongs to the same connection as that of the management cell. The IP packet including the management cell comprises a packet header and an information field in which the management cell with an ATM header and a group of data cells with respective ATM headers are disposed in order they are received.

In order to selectively transfer management cells among line interfaces, each of the line interfaces may be provided with a memory for storing information indicating whether a management cell should be relayed to another line interface in corresponding to each connection so that each of said line interface can refer the memory when a management cell is received from the input ATM line to determine the received management cell should be incorporated into an IP packet.

According to a preferred embodiment of the present invention, each of the line interfaces is provided with a memory for specifying the type of management cells to be relayed to another line interface in corresponding to each connection so that limited type of management cells specified by the above memory are incorporated into IP packets to be relayed to the other line interface.

Another aspect of the present invention resides in that the packet switch comprises a plurality of line interfaces coupled with a pair of input and output lines respectively, and a routing unit for relaying packets among said line interfaces, and each of said line interfaces is provided with means for determining which management cell should be relayed with respect to each connection in the input line associated therewith, memory means for storing data cells and a management cell received from the input line in order they are received with respect to each connection; means for extracting a packet header carried by the first cell of respective data packets, means for composing when the last cell of a packet is received an internal packet having said extracted packet header and an information field including at least one data cell and at least one management cell read out from said memory means and for passing the internal packet to the routing unit, means for decomposing an internal packet having at least one data cell and at least one management cell received from the routing unit into a plurality of cells, header converting means for correcting the connection identifier in the ATM header of respective decomposed cells based on the header information of said internal packet received from said routing unit, and means for sequentially transmitting said data cell and management cell to said output line associated therewith after said ATM header correction.

According to the present invention, a method is provided for relaying management cells in a packet switch having a plurality of line interfaces coupled with a pair of input and output ATM lines respectively, each of the line interfaces being configured to receive ATM cells consisting of a cell header and a payload respectively from the input ATM line associated therewith, and to convert a series of received ATM cells belonging to a same original packet to a first type of data packet having a packet header and an information field in which the payloads of the ATM cells are disposed continuously, said first type of packet being transferred to another line interface specified by the packet header and converted to ATM cells by said another line interface thereby to transmit to the output ATM line of the line interface, the method comprises the steps of (a) converting a series of ATM cells including at least one management cell received from the input ATM line of first one of said plurality of the line interfaces to a second type of data packet having a packet header and an information field in which the series of the ATM cells are disposed continuously, (b) transferring the second type of data packet to a second one of said plurality of line interface, (c) enabling the second line interface to extract the series of ATM cells from the information field of the second type of data packet, to update each of cell headers of said extracted ATM cells, and to transmit the ATM cells to the output ATM line of the second line interface.

According to the present invention, the packet switch can relay management cells, for example, as shown in FIG. 1, so it is possible for an ATM terminal or another packet switch connected to one of the output ATM lines of the packet switch to know the state of an error or congestion on the source side ATM line. In addition, it is also possible for an ATM terminal or another packet switch connected to one of input ATM lines of the packet switch to know the state of an error or congestion on the destination side ATM line.

BRIEF DESCRIPTION OF THE DRAWINGS

FIG. 12 is a diagram showing the configuration of the receiving VC table 60 included in the line interface shown in FIG. 11.

FIG. 13 is a diagram showing an example of the termination flag to be set in the receiving VC table 60 shown in FIG. 12.

FIG. 14 is a diagram showing an example of configuration of the receiving management table 66 included in the line interface shown in FIG. 11.

FIG. 15 is a diagram showing the correspondence between a receiving state and the value of the receiving flag 663 to be set in the receiving management table 66 shown in FIG. 12.

FIG. 16 is a diagram showing the data structure in the receiving buffer memory 64 included in the line interface shown in FIG. 11.

FIG. 17 is a flow chart of cell receiving routine performed by the line interface shown in FIG. 11.

FIG. 20 is a detailed flow chart of the receiving process 870 for intermediate cell included in the cell receiving routine shown in FIG. 17.

FIG. 21 is a detailed flow chart of the receiving process 860 for the last cell included in the cell receiving routine shown in FIG. 17.

FIG. 26 is a diagram showing the configuration of the transmission management table 67 included in the line interface shown in FIG. 11.

FIG. 27 is a diagram showing the configuration of the transmission VC table 68 included in the line interface shown in FIG. 11.

DETAILED DESCRIPTION OF THE INVENTION

Hereunder, an embodiment of the present invention will be described with reference to the accompanying drawings.

Figure 2:
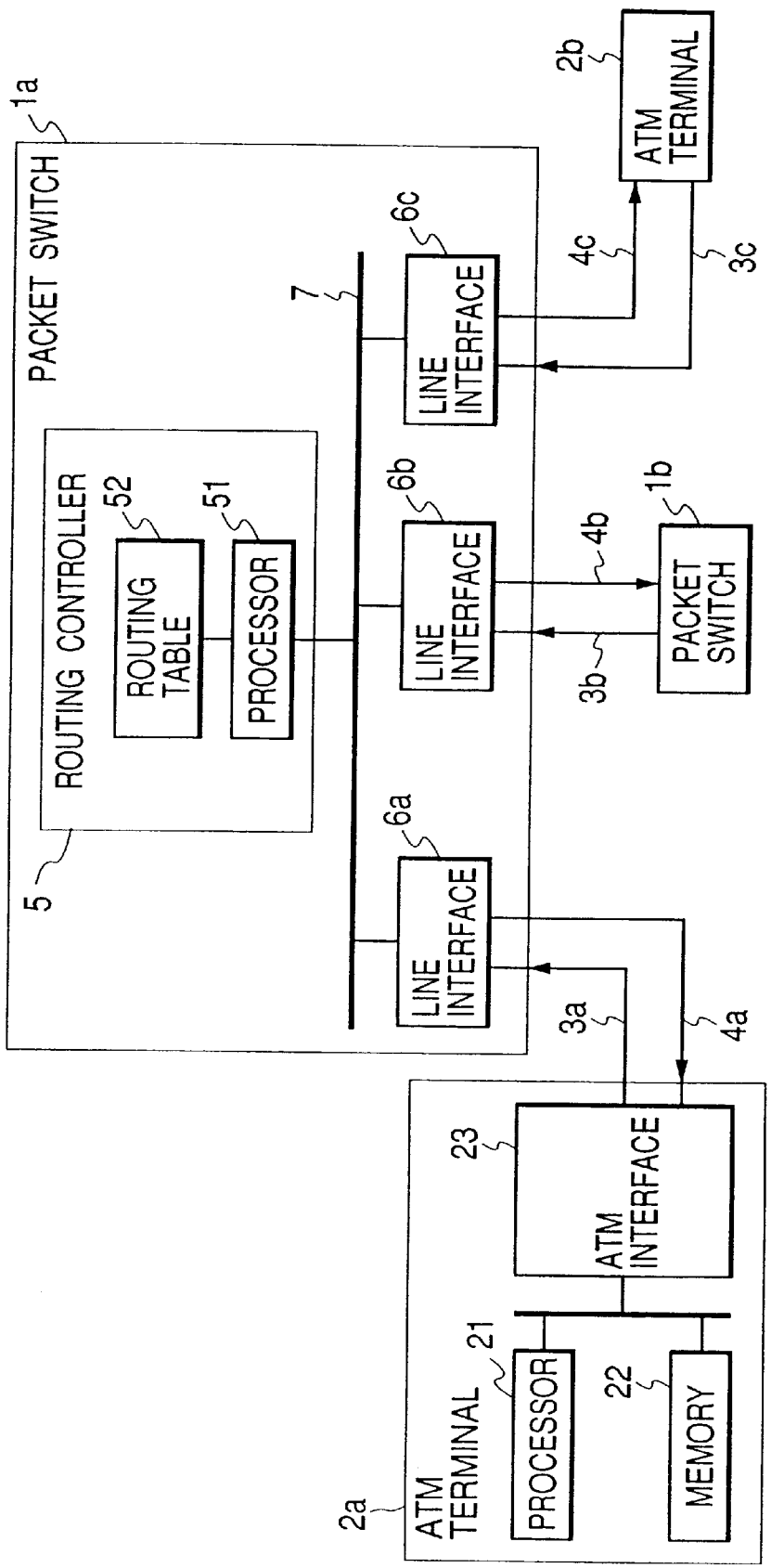
FIG. 2 is a block diagram showing a configuration of the packet switch in the prior art technologies.

Like the packet switch in the related art technologies shown in FIG. 2, the packet switch of the present invention comprises a routing controller 5 and a plurality of line interfaces 6 (6a, 6b, 6c, . . . ) connected to the routing controller 5 via an internal bus 7. However, the functions of each of the line interfaces 6 and the routing controller 5 differ from those of the related art technologies as to be described later.

In order to simplify the following description, the packet switch 1 shown in FIG. 2 is provided with only 3 line interfaces. Actually, however, the packet switch of the present invention may be provided with more line interfaces to enable communications with many ATM terminals or other packet switches.

Figure 11:
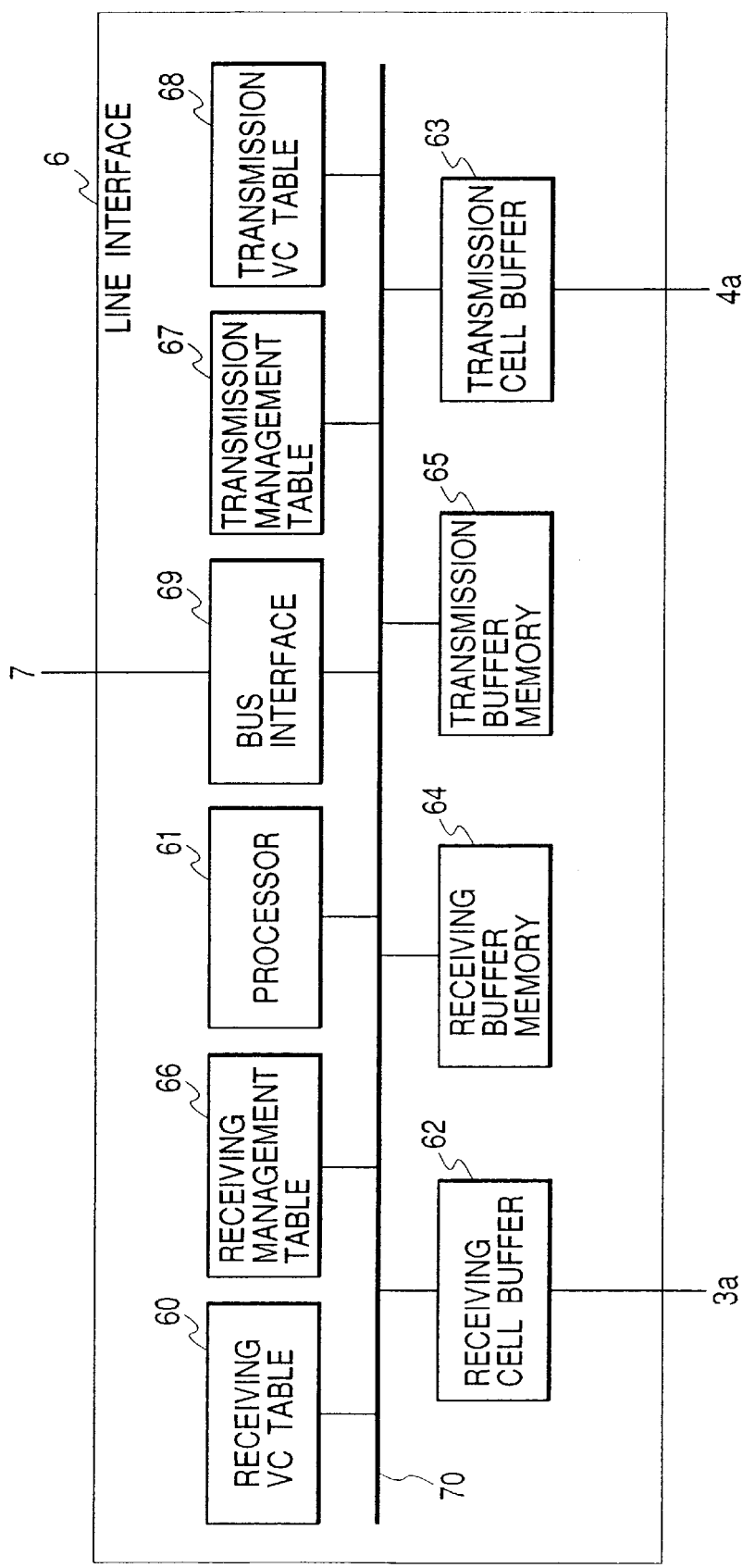
FIG. 11 is a block diagram showing an embodiment of a line interface provided for the packet switch of the present invention.

FIG. 11 shows an example of the configuration of a line interface 6 included in the packet switch 1a.

Numeral 60 is a receiving VC table, 61 is a processor for executing both received cell processing and received packet processing to be described later, and 62 is a received cell buffer for storing cells received from an input ATM line 3a temporarily. Numeral 63 is a transmission cell buffer for storing ATM cells to be transmitted to an output ATM line 4a.

Numeral 64 is a receiving buffer memory, 65 is a transmission buffer memory, 66 is a receiving management table, 67 is a transmission management table, 68 is a transmission VC table, and 69 is a bus interface for transmitting and receiving packets with a routing controller 5. Those elements are connected to each another via an internal bus 70. In this embodiment, each of tables 60, 66, 67, and 68 is connected to the internal bus 70 independently of others in order to simplify the description. However, it is clear that each of those elements may be formed to in a memory area different from others in one memory unit connected to the internal bus 70, of course.

FIG. 12 shows an example of the configuration of the receiving VC table 60.

The receiving VC table 60 includes a plurality of records, each of which corresponds to the VPI/VCI included in an input cell header received via the received cell buffer 62. Each record includes a VPI/VCI value 600, a head flag 601 indicating whether or not a received cell is the first cell of an IP packet, a termination flag 602 to identify the type of cells to be terminated at this packet switch, and a pointer 603 to a receiving management table 66.

FIG. 13 shows an example of the configuration of the termination flag 602 in the receiving VC table 60.

Numerals 604 to 609 are flag bits indicating whether to terminate a resource management cell, a VC AIS (Alarm Indication Signal) cell, a VC RDI (Remote Defect Indication) cell, a VC LB (Loop-back) cell, a VC CC (Continuity Check) cell, and a VC PM (Performance Monitoring) cell respectively. If "1" is set in any of these flag bits, the management cell corresponding the flag bit is terminated.

FIG. 14 shows an example of the configuration of the receiving management table 66.

The receiving management table 66 is used to manage received cells transferred to the receiving buffer memory 64 from the received cell buffer 62 by linking those cells by IP packet. The table 66 includes a plurality of records 660, each corresponding to an IP packet. Each of those records 660 includes a next packet address 661 indicating a record to manage the next packet to arrive, which belongs to the same connection (VPI/VCI) as that of the IP packet managed by the record, a receiving flag 663 to be described later, an IP header 664, a linked cell count 665, a head pointer address 666 indicating the first cell of a series of linked cells, and a tail pointer address 667 indicating the last cell of a series of linked cells.

FIG. 15 illustrates the correspondence between the value of the receiving flag 663 included in each record 660 in the receiving management table and the receiving state of linked cells managed by the record 660. The value of the receiving flag is "10" when the record 660 is not used yet. When the first cell of an IP packet which carries the IP header to be set in the area 664 does not arrive yet "00" is set in the value of the receiving flag. When the first cell of an IP packet arrives, "01" is set and when the last cell of the IP packet arrives and it becomes the state for enabling the packet to be transferred to the routing controller 5, the value of the receiving flag is changed to "11".

FIG. 16 shows the link structure of received data (received ATM cell) managed by both receiving VC table 60 and receiving management table 66 described above.

The receiving management table record 660-11 is used to manage a list of linked ATM cells of the first IP packet corresponding to the VPI/VCI managed by the receiving VC table record 60-1 and the receiving management table record 660-12 is used to manage a list of linked ATM cells of the second IP packet corresponding to the VPI/VCI. The receiving management table record 660-11 is addressed by the pointer 603 of the receiving VC table record 60-1 and the receiving management table record 660-12 is addressed by the next packet address 661 of the receiving management table record 660-11. The first IP packet consists of 5 ATM cells linked with each other by the addresses of the receiving buffer memory 64 from the first cell 300-10 indicated by the head pointer address 666 to the last cell 300-15 indicated by the tail pointer address 667. In the case of this invention, these 5 ATM cells composing the first IP packet are linked with a management cell 301-m included therein. The second IP packet is in the state that only the first cell 300-20 and the second cell 300-21 are received and the last cell of the second IP packet is not received yet. In this embodiment, since the management cell 301-n is received after the last cell 300-15 of the first IP packet, the management cell 301-n is addressed by the head pointer address 666 of the second receiving management table record 660-12 and the real first cell 300-20 of the second IP two packet is linked with the management cell 301-n.

In this specification, such an IP packet that includes a plurality of user ATM cells linked with each other together with at least one management cell to be relayed to an output line interface just like as the first and second IP packets is referred to as a "management cell relay packet". On the other hand, such an IP packet that includes payload portions of a plurality of user ATM cells without including any management cell is referred to as a "normal packet".

Figure 1:
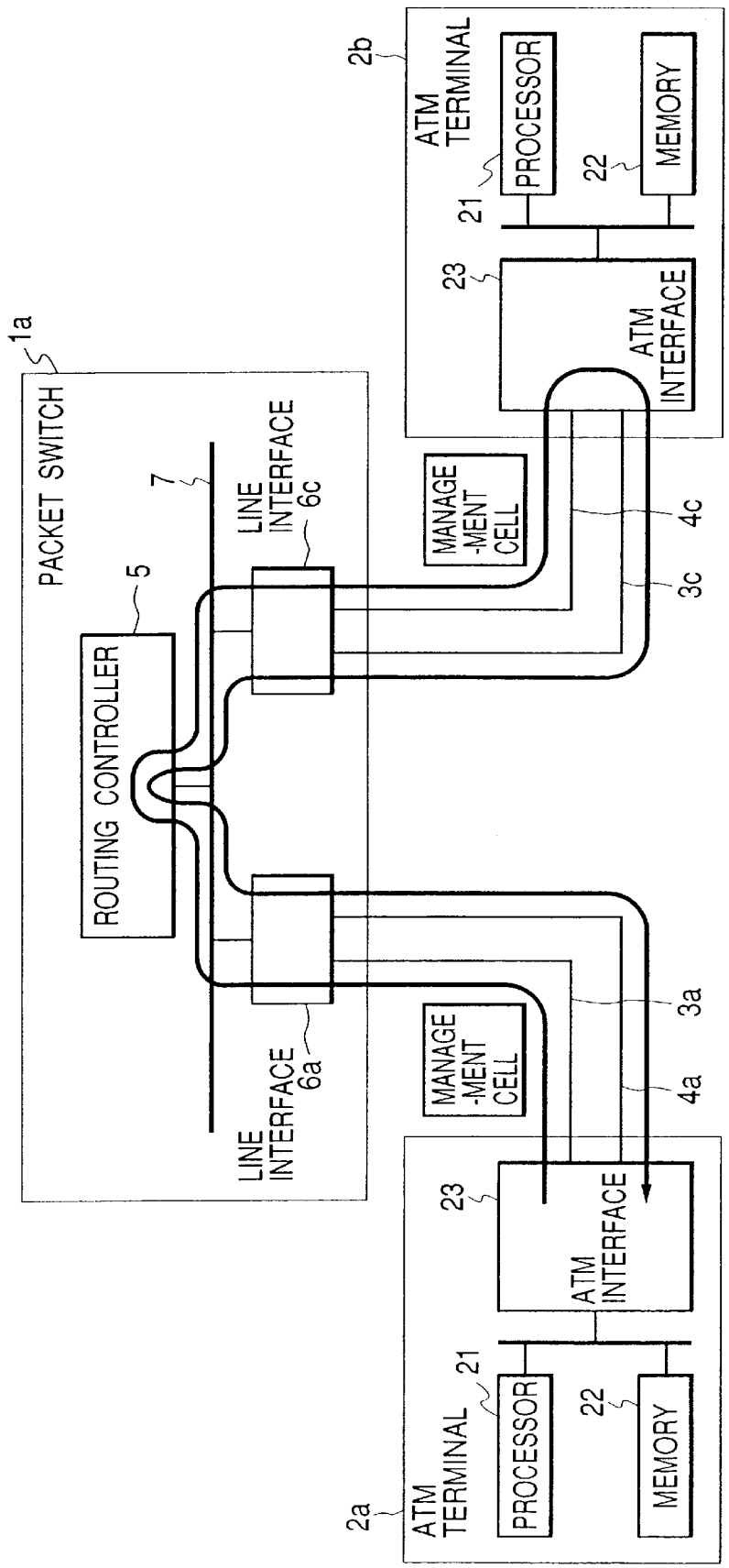
FIG. 1 is a diagram showing the flow of a management cell in the packet switch of the present invention.

Hereunder, description will be made for a processing to receive cells from the ATM line 3a and a processing to receive packets from the routing controller 5 performed by the input line interface 6a respectively with reference to an example of relaying a management cell to the output line interface 6c from the input line interface 6a via the routing controller 5 as shown in FIG. 1.

The processor 51 of the packet switch 1a, like the packet switch of the related art technologies, presets routing information in the routing table 52 according to the conventional routing protocol, for example, the OSPF (Open Shortest Path First). The routing information indicates the correspondence between a destination IP address and an output line interface 6b. The processor 51 also assigns VPI and VCI values for each pair of source IP address and destination IP address of an IP packet as needed, as well as presets information indicating the correspondence between a pair of source IP address and destination IP address and VPI/VCI to be added to an output cell in the output line interface 6c in the transmission VC table 68 of the line interface 6c.

The processor 61 of the input line interface 6a manages empty records in the receiving management table 66 and empty areas in the receiving buffer memory 64. In addition, the processor 61 sets "1" in the start flag 601 of each VPI/VCI record when the receiving VC table 60 is initialized and sets "0" in the element bit corresponding to the type of the management cell to be relayed to an object output line interface and "1" in each of other element bits to indicate that the object management cell should be terminated in an object input line interface.

FIG. 17 shows a flow chart of a received cell processing routine to be executed by the processor 61 in the input line interface 6a.

Receiving a cell from the ATM line 3a (step 800), the processor 61 in the line interface 6a extracts the VPI/VCI from the ATM header of the received cell (step 805) and searches the receiving VC table 60 according to the extracted VPI/VCI value and checks the termination flag 602 of registered records matching with the extracted VPI/VCI (step 810). If "1" is set in the bit of the element bits 604 to 609 of the termination flag 602, which corresponds to the received cell, then the received cell which is read from the received cell buffer 62 is terminated like in the related art packet switch. Because, the received cell has been determined to be a management cell to be terminated in the input line interface 6a. Thus, the received cell is not relayed to any output line interface (step 835).

If the received cell is a data cell or a management cell for which "0" is set in the element bit of the termination flag 602, which corresponds to the received cell, then the received cell is transferred to the receiving buffer memory 64, so that a structure of a linked cells list shown in FIG. 16 is formed using the receiving management table 66.

In other words, if the received cell is a data cell or a management cell to be relayed, the processor 61 checks the head flag 601 of the receiving VC table record corresponding to the received cell (step 815). If "0" is set in the head flag 610, the received cell is not the first cell of a packet. An addition process 830 for a received cell to be detailed in FIG. 19 is thus executed. If "1" is set in the head flag 601, the received cell is the start cell of a packet. A receiving process for a firs cell is executed (step 820), the detail of this process will be explained later by referring FIG. 18.

When the addition process for a received cell (step 830) is finished, the processor 61 references to the PTI field of the received ATM cell header to check if the received cell is the last cell of an IP packet or not (step 840). If the received cell is the last cell of an IP packet, the bit pattern of the PTI field should be "001" or "011". If the received cell is not the last cell, the processor 61 executes a receiving process for an intermediate cell to be detailed in FIG. 20 (step 870). If the received cell is the last cell, the processor 61 checks if "1" is set in all the element bits of the termination flag 602 of the receiving VC table record corresponding to the received cell (step 850). If "1" is set in all the element bits, it means that there is no management cell to be relayed to an object output line interface in the connection (a VPI/VCI pair). The processor 61 thus executes the last cell processing (step 880) for the normal IP packet. If "0" is set in any element bit of the termination flag 602, it means that there is a management cell to be relayed to the output line interface in the connection. Thus, the processor 61 processes the last cell of the management cell relay packet (step 860), since user cells and a management cell co-exist and are formed as linked cells as shown in FIG. 16.

If "1" is set in the start head 601 of the receiving VC table 60 in step 815, it means that the received cell is the first cell of a packet. Thus, the processor 61 performs receiving process for the first cell (step 820), then checks if the received cell is the last cell of the IP packet according to the value in the PTI field of the ATM cell header (step 841).

If the received cell is not the last cell, the processor 61 exits the routine. If the received cell is the last cell, the processor 61 checks if "1" is set in all the element bits of the termination flag 602 (step 850). The processor 61 then performs a receiving process for the last cell of a normal IP packet (step 880) or a receiving process for the last cell of a management cell relay packet (step 860) depending upon the status of the termination flag.

Hereunder, supplemental description will be made for how received cells are stored in the receiving buffer memory 64 with reference to FIG. 16.

Cells 300 and 301 are stored in the receiving buffer memory 64 so that each cell body is paired with the next cell pointer address. In each record of the receiving VC table 60 corresponding to each cell VPI/VCI, the pointer 603 indicates the receiving management table record 660-11 for managing a plurality of ATM cells received from the same ATM connection in units of a packet. The next packet address 661 of the receiving management table record 660-11 indicates the next receiving management table record 660-12 for managing the ATM cells of the next packet belonging to the same ATM connection, received during a processing of the preceding packet. The receiving flag 663 indicates the receiving state of a packet managed in this record and it indicates whether or not the first cell of the packet is already received. The IP header 664 is an area for storing the IP header 120 of a received packet. The cell count 665 indicates the total number of cells having been received so far to compose the packet. The head pointer address 666 indicates an address location of the receiving buffer memory 64 in which an management cell or the first cell composing the packet is stored. The tail pointer address 667 indicates an address location of the receiving buffer memory in which the last received cell of a series of cells composing the packet is stored.

If "1", is set in the head flag 601 of the receiving VC table record 60-1 corresponding to the received cell VPI/VCI and the pointer 603 indicates an invalid area when a received cell is taken out from the received cell buffer 62, there is no packet received from the same ATM connection as that of the received cell. The processor 61 thus assigns a new receiving management table record 660-11 to the receiving VC table record 60-1 and stores a new record pointer in the pointer 603.

The processor 61 sets an invalid area pointer in the next packet address 661 in the new table record 660-11 and sets "1" for the cell count 665. In addition, in order to store the received cell and the next cell point, the processor 61 secures an empty memory area in the receiving buffer memory 64 and sets the empty memory area address value in both the head pointer address 666 and tail pointer address 667 in the table record 660-11. Then, the processor 61 stores the received cell in the receiving buffer memory 64. Processings of both receiving flag 663 and IP header 664 of the table record 660-11 will be described later.

If "1" is set in the head flag 601 of the receiving VC table record 60-1 and the pointer 603 indicates a valid area, it means that there is a packet under receiving in the ATM connection corresponding to the receiving VC table record. In such a case, the processor 61 checks the next packet addresses 661 one after another starting at the first receiving management table record 660-1 indicated by the pointer 603 of the receiving VC table record 60-1 thereby to find the last table record in which the next packet address 661 indicates an invalid area. After this, the processor 61 secures a new receiving management table record and links it with the last table record in the next packet address 661 of the last table record, so that the table record is decided as a new last one. The processor 61 then sets an invalid area value in the next packet address 661 and "1" in the cell count 665 in the new last table record. Then, the processor 61 secures an empty area in the receiving buffer memory 64 and sets the empty area address both in the head pointer address 666 and in the tail pointer address 667. The processor 61 then stores the received cell in the empty area of the receiving buffer memory 64 just like when a cell is received while there is no packet under receiving. The receiving flag 663 and the IP header 664 in the new last record will be described later.

If "0" is set in the head flag 601 in the receiving VC table record 60-1 corresponding to the VPI/VCI of the received cell, the processor 61 finds the last receiving management table record linked with the above receiving VC table record 60-1 according to the pointer 603 and the next packet address 661. The processor 61 then increments the cell count 665 by one and secures an empty area in the receiving buffer memory 64 and updates the value of the tail pointer address 667 to the address of the secured buffer area. After this, the processor 61 updates the next cell address paired with the cell indicated by the tail pointer address 667 so far to the above last address, then stores the received cell in the secured empty area in the receiving buffer memory 64. The processings of the receiving flag 663 and the IP header 664 performed at this time will be described later.

If the received cell is the last cell of a packet, the packet is transferred to the routing controller 5 through the receiving process for the last cell (step 860 or 880). When the transferring of the packet to the routing controller is finished, the cell storing area used by the packet in the receiving buffer memory 64 is released and this area address is registered as an empty area address in the processor 61. At this time, the receiving management table record corresponding to the packet transferred already to the routing controller 5 is also released. The pointer 603 of the receiving VC table 60 is updated to the next packet address 661 of the above released table record. The above released table record is then registered as an empty area in the processor 61.

Hereunder, description will be made for the details of the first cell receiving routine 820, referring to FIG. 18.

At first, the processor 61 sets "0" in the head flag 601 (step 822), then secures an empty area in the receiving buffer memory 64 just like in the received cell storing processing described above. After this, the processor 61 sets "1" for the cell count 665 in the receiving management table record 660 corresponding to the received cell and stores the address of the above receiving buffer memory both in the head pointer address 666 and in the tail pointer address 667 (step 823) and stores the received cell in the receiving buffer memory (step 824).

After this, the processor 61 checks the value of PTI of the received cell and determines if the received cell is the first cell of an IP packet or not (step 825). If the PTI value is "000" or "010", the received cell is the first cell of an IP packet. In this case, the processor 61 sets the header of the IP packet extracted from the payload of the received cell into the IP header 664 of the receiving management table record 660 (step 827) and sets "01" in the receiving flag 663 (step 828) to exit this processing. If the PTI value of the received cell is neither "000" nor "010", the received cell is a management cell. In this case, the real first cell of an IP packet including the IP header portion does not arrive yet. The processor 61 thus sets "00" in the receiving flag of the receiving management table record 660 (step 826) and exits the routine.

Hereunder, description will be made for the details of the received cell addition routine 830, referring to FIG. 19.

At first, the processor 61 searches the receiving VC table 60 based on the VPI/VCI of the received cell, then searches the receiving management table record 660 corresponding to the packet under receiving according to the pointer 603 of the VC table record including the same VPI/VCI as that of the received cell, thereby to read out the tail pointer address 667 of the record, then obtains an empty address of the receiving buffer memory 64. The empty address is set in the receiving buffer memory 64 as link information to a new last received cell from the last received cell which is stored at the tail pointer address location of the receiving buffer memory. The empty address is also set in the tail pointer address field 667 of the receiving management table record 660 as a new tail pointer address (step 832). Then, the processor 61 increments the cell count 665 of the receiving management table record by one (step 834), then stores the received cell in the empty address in the receiving buffer memory (step 835) and exist the routine.

Hereunder, description will be made for the details of the intermediate cell receiving routine 870.

At first, the processor 61 checks the PTI value of received (step 872). If the PTI value is neither "000" nor "010", the processor 61 exits the routine 870 with no operation. If the PTI value is "000" or "010", the processor 61 searches the receiving management table record 660 to check the value of the receiving flag 663 (step 874) just like in the routine 830. If the value of the receiving flag 663 is "01", the processor 61 exits this routine with no operation. If the value of the receiving flag 663 is not "01", it means that the received cell is the first cell of an IP packet. Thus, the processor 61 sets the header of the IP packet extracted from the payload of the received cell in the IP header field 664 of the receiving management table record 660 (step 876) and updates the value of the receiving flag 663 to "01" then exits the routine.

Hereunder, description will be made for the details of the receiving routine 860 for the last cell of a management cell relay packet.

At first, the processor 61 checks the PTI value of received cell (step 872). If the PTI value is neither "000" nor "010", the processor 61 exits the routine 870 with no operation. If the PTI value is "000", or "010", the processor 61 searches the receiving management table record 660 to check the value of the receiving flag 663 (step 874) just like in the routine 830. If the value of the receiving flag 663 is "01", the processor 61 exits this routine with no operation. If the value of the receiving flag 663 is not "01", it means that the received cell is the first cell of an IP packet. Thus, the processor 61 sets the header of the IP packet extracted from the payload of the received cell in the IP header field 664 of the receiving management table record 660 (step 876) and updates the value of the receiving flag 663 to "01", the exists the routine.

Figure 3:
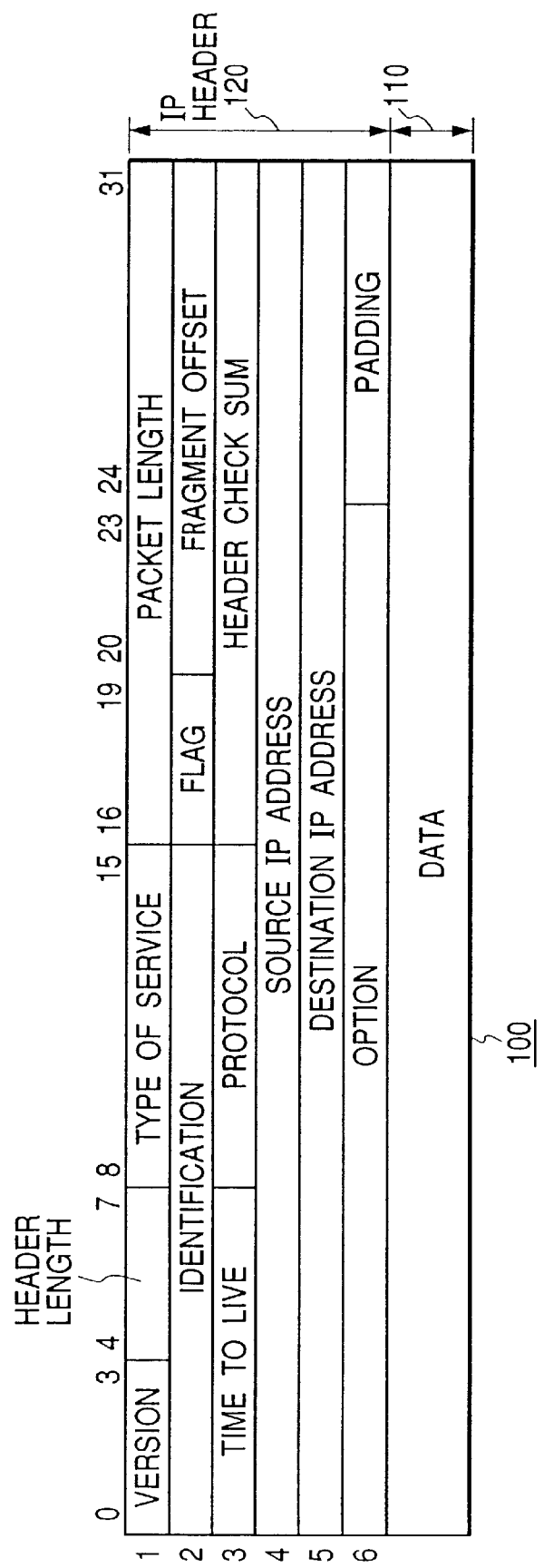
FIG. 3 is a diagram showing the format of IP (Internet Protocol) packets.

The above management cell relay packet is valid only within the packet switch of the present invention. In order to prevent a mistake to output the management cell relay packet to an ATM terminal, "1" is set beforehand in the field of time to live in the IP header field 664. In addition, the packet length in the IP header field 664 is set to a value obtained by adding a first value of 53 times the cell count 665 and a second value of 4 times the IP header length (the value of the IP header 120 indicated in bytes in FIG. 3) then the header check-sum is updated (step 864). After this, the processor 61 reads the IP header 664 from the receiving management table record 660 and reads out the linked cells sequentially from the first cell indicated by the head pointer address 666 to the last cell indicated by the tail pointer address 667 from the receiving buffer memory 64 thereby to compose a management cell relay packet (step 865). The above management cell relay packet is composed of an IP header 664 and an information field in which a plurality of 53-byte cells each including an ATM header respectively are disposed. Finally, the processor 61 transmits the management cell relay packet to the routing controller 5 via the bus interface 69 (step 866). Completing the transmission of the packet, the processor 61 registers the record area of the receiving management table 66 and the record area of the receiving buffer memory 64 corresponding to the transmitted packet respectively as empty areas.

Hereunder, description will be made for the details of the receiving routine 880 for the last cell of the normal packet.

At first, the processor 61 sets "1" in the head flag 601 of a record of the receiving VC table which corresponds to the VPI/VCI of the received cell(step 882) and sets "11" in the receiving flag 663 of the receiving management table record corresponding to the above VPI/VCI (step 863). After this, the processor 61 reads out a plurality of cells sequentially from the first cell indicated by the head pointer address 666 to the last cell indicated by the tail pointer address 667 of the receiving management table record from the receiving buffer memory 64. The processor 61 then removes the ATM header from each of those cells and the above received cells (step 884), then combines the payload data of those cells on the basis of the received data structure thereby to compose an AAL5 data structure (step 885). After this, the processor 61 removes the AAL5 trailer from the above data structure (step 886) and also removes the LLC/SNAP additional information according to the IETF RFC1483 (step 887) thereby to recompose an object IP packet. If the IP packet includes an option area, the processor 61 checks the option area (step 891). If the first byte value of the option area is 32 to 63, 96 to 127, 160 to 191, or 224 to 255, the processor discards the IP packet (step 892) thereby to prevent an illegal value set IP packet from being transferred to the routing controller 5.

If the first byte value of the option area is not any of the above values, the processor 61 transmits the IP packet to the routing controller 5 via the bus interface 69 (step 888).

Completing the transmission of the IP packet, the processor 61 registers the record areas of both receiving management table 66 and receiving buffer memory record corresponding to the transmitted IP packet respectively as empty areas.

Figure 23A:
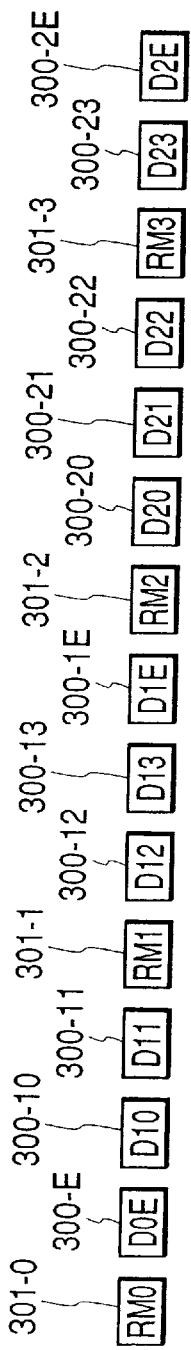
FIGS. 23A and 23B are diagrams for explaining the correspondence between a received cell flow (FIG. 23A) and management cell relay packets (FIG. 23B).
Figure 23B:
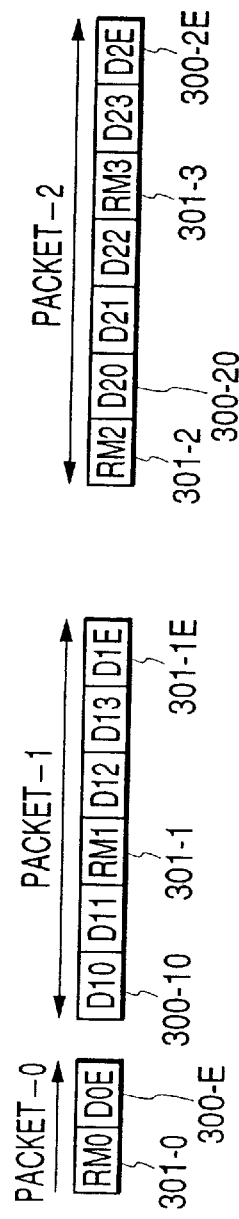

FIGS. 23A and 23B show the correspondence between a received cell flow and a management cell relay packet.

In FIG. 23A, each of the boxes 301-0 to 301-3 provided with a 1-digit number after "RM" indicates a resource management cell. The 1-digit number indicates a serial number of resource management cells. Each of the boxes 300-E to 300-2E provided with a 2-digit number after "D" or 1digit number and "E" indicates a data cell. The first number following "D" is a serial number of IP packets and the next number indicates a serial number of data cells in an IP packet. The "E" indicates the last cell of the data cells composing an IP packet. For example, 5 cells of D10, D11, D12, D13 and D1E belong to a same IP packet. In FIG. 23A, cells arrive in the line interface 6 sequentially from left to right.

The present invention is characterized in that the received cell string shown in FIG. 23A is edited into a packet including data cells and a management cell together as shown in FIG. 23B, that is, a management cell relay packet.

Figure 24:
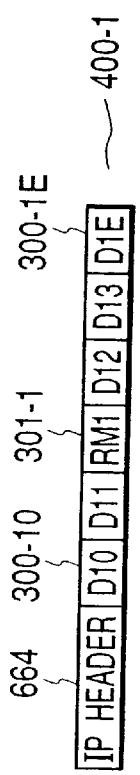
FIG. 24 is a diagram showing an example of the configuration of a management cell relay packet constructed in the cell receiving routine shown in FIG. 17.

According to the control flow chart described in FIG. 17, a cell D10 arrives after a cell D0E and when a cell D0E is received, "1" is set in the head flag of the receiving VC table 60. The cell D10 is thus processed as the first data cell of a new IP packet (step 820). In addition, since the cell D10 is a data cell, the process for setting the IP header 664 is carried out (steps 827, 828). If a data cell D11, a management cell RM1, and data cells D12 and D13 are received, the head flag 601 of the receiving VC table is already reset to "0" because of the receiving of the first data cell D10. Thus, an addition process for a received cell (step 830) and a receiving process for an intermediate cell (step 870) are executed. In this case, setting of the IP header 664 is already finished when the data cell D10 is received, so processings in steps 876 and 878 shown in FIG. 20 are not executed. When the last data cell D1E is received, an addition process for a received cell (step 830)and a receiving process for the last cell of a management cell relay packet are executed (step 860). Consequently, data cells 300 and management cells 301 are added after the IP header in order they are received as shown in FIG. 24 and as described in FIG. 21, so that one management cell relay packet 400-1 is composed.

Back to FIG. 23A. Since the management cell RM2 arrives after the last data cell D1E of the preceding IP packet, "1" has been set in the head flag 601 of the receiving VC table 60 when the management cell RM2 is received. Consequently, the above management cell is processed as the first cell of the next IP packet (step 820) although it is not a data cell and then "0" is set in the head flag 601 of the receiving VC table.

Figure 18:
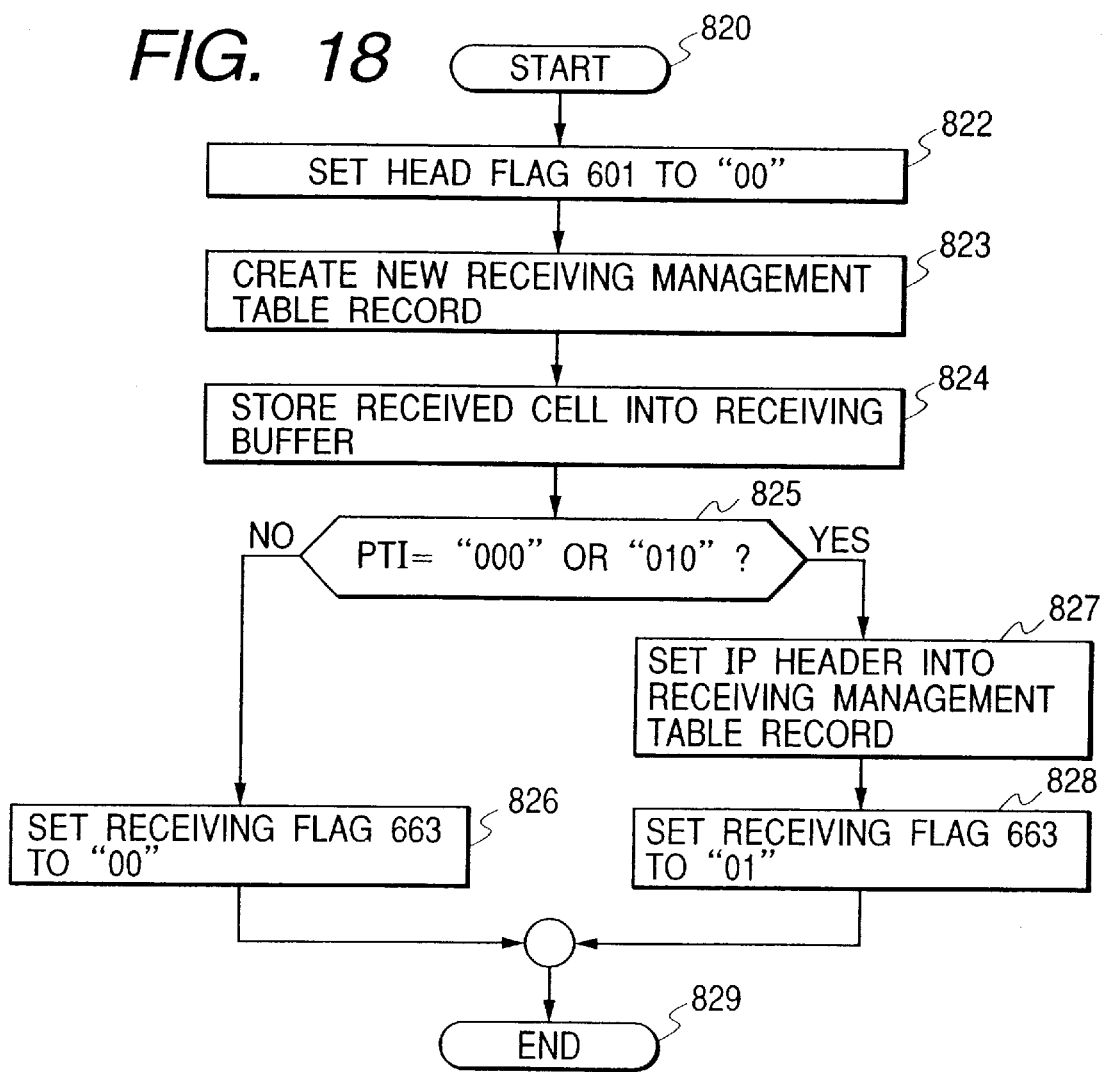
FIG. 18 is a detailed flow chart of the receiving process 820 for the first cell included in the cell receiving routine shown in FIG. 17.
Figure 19:
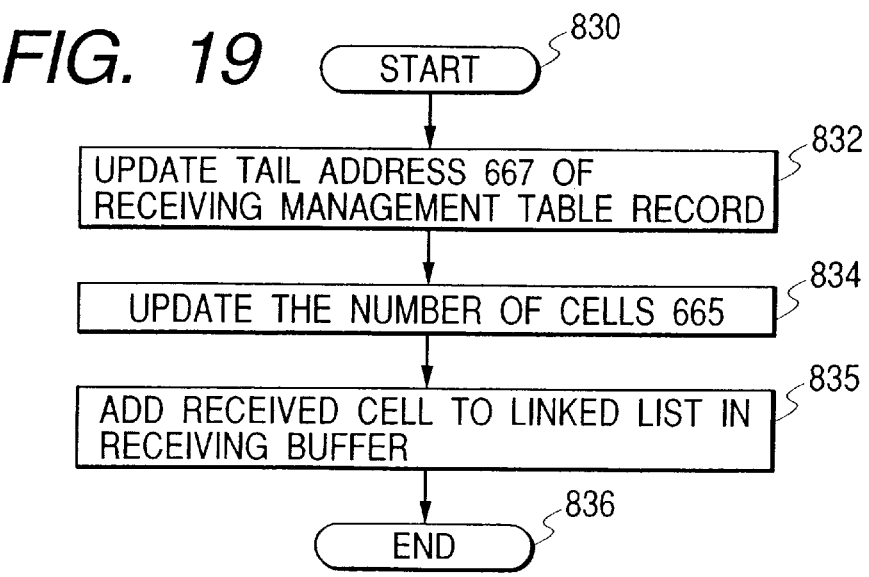
FIG. 19 is a detailed flow chart of the addition process 830 for received cell included in the cell receiving routine shown in FIG. 17.
Figure 22:
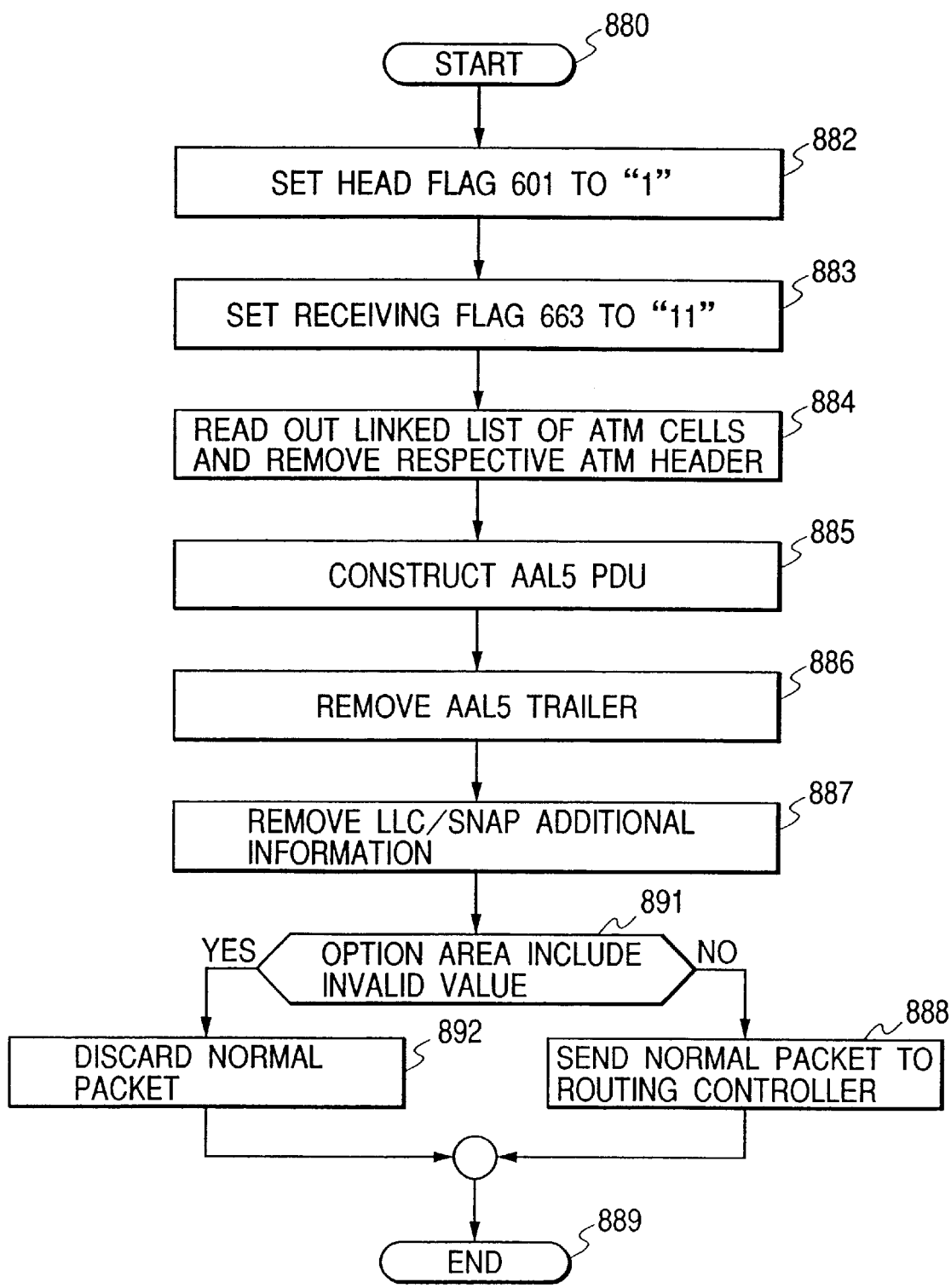
FIG. 22 is a detailed flow chart of the receiving process 880 for the last cell of the normal packet forwarding included in the cell receiving routine shown in FIG. 17.

In this case, since the first cell RM2 is a management cell, the setting process of the IP header 664 (step 827) shown in FIG. 18 is not executed. Thus, "00" is set in the receiving flag 663 (step 826).

When a data cell D20 is received after the management cell RM2, since "0" has been already set in the head flag 601 of the receiving management table 66, the addition process for a received cell (step 830) and a receiving process for an intermediate cell (step 870) are executed. In this case, since "00" was set in the receiving flag, the IP header setting steps 876 and 878 are executed. When data cells D21 and D22, as well as a management cell RM3 and a data cell D23 are received, the addition process for received cells (step 830)

and the receiving process for an intermediate packet (step 870) are executed, since "0" was already set in the head flag 601. However, since the IP header 664 was already set in the receiving management table when the preceding data cell D20 is received, the steps 876 and 878 in FIG. 20 are not executed. When the last data cell D2E of an IP packet is received, the addition process for a received cell (step 830) and the receiving process for the last cell (step 860) are executed. Consequently, a management cell relay packet is composed of the cells RM2, D20, D21, D22, RM3, D23, and D2E as shown in FIG. 23B.

In the routing controller 5, when receiving the above management cell relay packet or a normal IP packet from the line interface 6a, the processor 51 checks the IP header of the received packet and discards the IP header if it is illegal just like the related art technology. If the IP header is correct, the processor 51 decrements the value of time to live in the IP header by one, then searches the routing table 52 and transmits the received packet to the output line interface 6c corresponding to the destination address of the received packet via the internal bus 7.

If an option area is included in the IP header of the received packet from a line interface, the processor 51 discards the received packet if the value in the first byte of the option area is within 32 to 63, 96 to 126, 160 to 191, or 224 to 255. If the value of the first byte of the option area is 127, the processor 51 judges the received packet as a management cell relay packet and transfers the packet to the output line interface 6c in the same procedure of a normal IP packet.

Next, description will be made in detail for how a packet received from the routing controller is treated in the output line interface, referring to FIGS. 25, 26, and 27.

FIG. 26 shows the configuration of the transmission management table 67. The transmission management table 67 consists of a plurality of records 670 for storing the start address 672 and the last address 673 corresponding to the IP header 671.

FIG. 27 shows the configuration of the transmission VC table 68. The transmission VC table 68 includes a plurality of records 680 for storing a source IP address 681, a destination IP address 682, a VPI/VCI 683 to be added to an output cell, and a termination flag 684. The termination flag 684 is composed just like the termination flag 602 of the receiving VC table 60.

Figure 25:
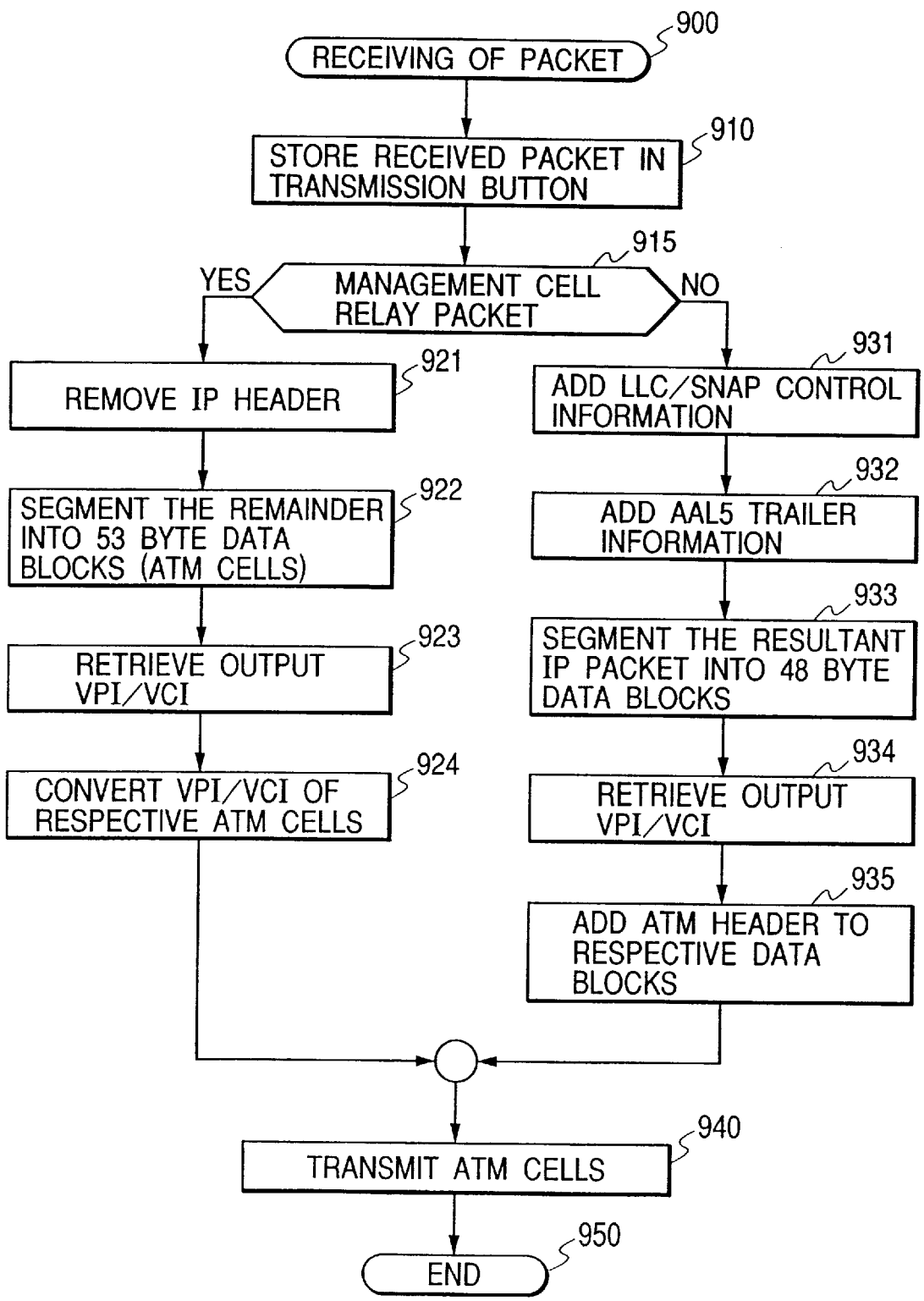
FIG. 25 is a flow chart of a packet receiving routine for treating a packet from the routing controller by the line interface shown in FIG. 11.

As shown in FIG. 25, the processor 61 of the line interface 6c, when receiving an IP packet (management cell relay packet or normal IP packet) from the routing controller 5 (step 900), stores the received IP packet into an empty area in the transmission buffer memory 65 and also stores the IP header of the received IP packet and the first and last addresses of the IP packet stored in the transmission buffer memory 65 into the IP header 671, the head pointer address 672 and tail pointer address 673 of an empty record in the transmission management table 67, respectively (step 910). Then, the processor 61 checks the option area of the IP header of the received IP packet to judge whether the received packet is a management cell or not (step 915).

If the IP header includes an option area and the value of the first byte of the option area is 127, then the received packet is a management cell relay packet composed as shown in FIG. 24. In this case, the processor 61 removes the IP header from the received packet (step 921) and divides the information field of the received packet in units of 53 bytes, that is, into a plurality of 53 byte length data blocks, each of which corresponds to an ATM cell(step 922). In this step, the processor 61 decrements the value of the time of life in the IP header 120 by one. This IP header resides in the first data block of said divided information field. Then, the processor 61 searches the transmission VC table 68 based on the source IP address and the destination IP address obtained from the IP header of the received IP packet thereby to read out the output VPI/VCI 683 (step 923) and to convert the value of the VPI/VCI field of the ATM header located at the head portion of each divided data block to the value of said output VPI/VCI (step 924), whereby the received packet is converted to transmission cells. These transmission cells are written in the transmission cell buffer 63 one after another and sent out to the output ATM line 4c (step 940).

Figure 4:
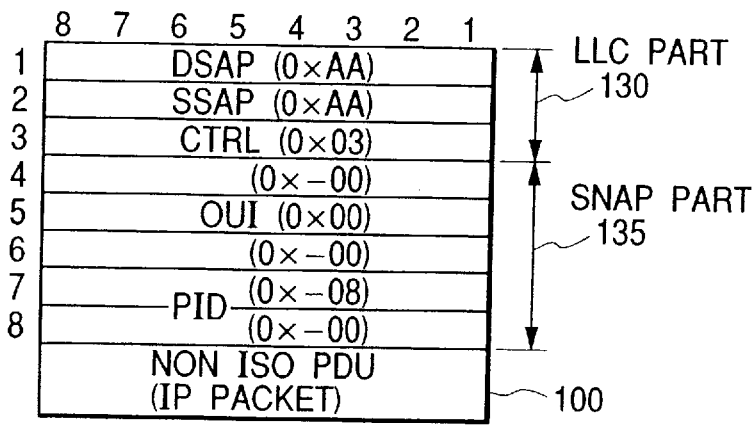
FIG. 4 is a diagram showing the format of the IETF RFC 1483.
Figure 5:
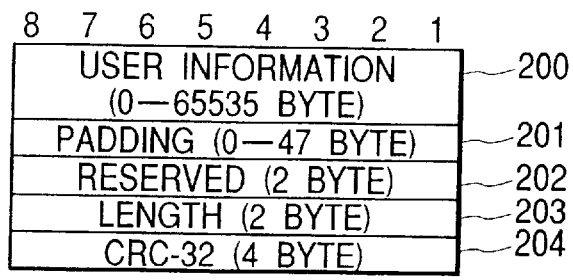
FIG. 5 is a diagram showing the format of the CPCS (Common Part Convergence Sublayer) of the AAL (ATM Adaptation Layer).
Figure 6:
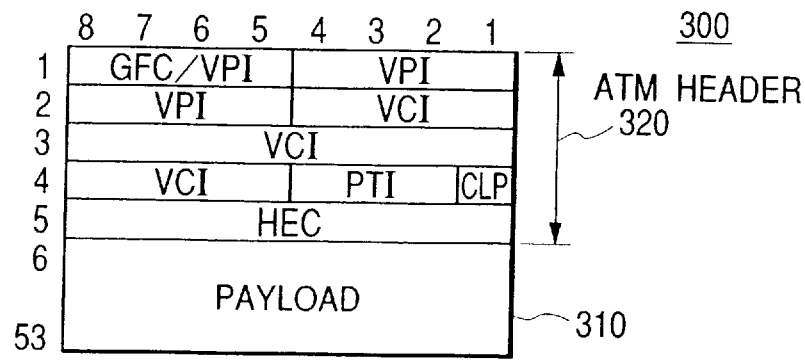
FIG. 6 is a diagram showing the format of ATM cells.
Figures 7, 8, 9:
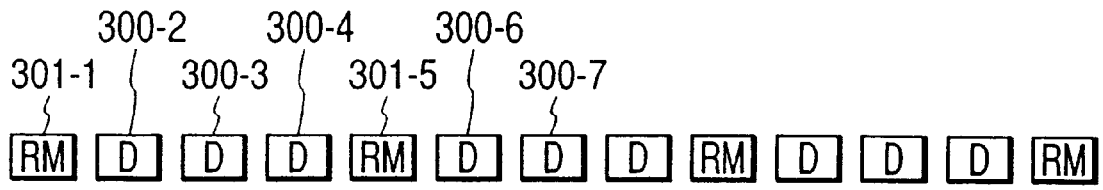
FIG. 7 is a diagram showing the flow of management cells and user cells transmitted in communications of ARB service.
FIG. 8 is a diagram showing the format of the payload of an RM cell.
FIG. 9 is a diagram showing the format of the message type of an RM cell.
Figure 10:
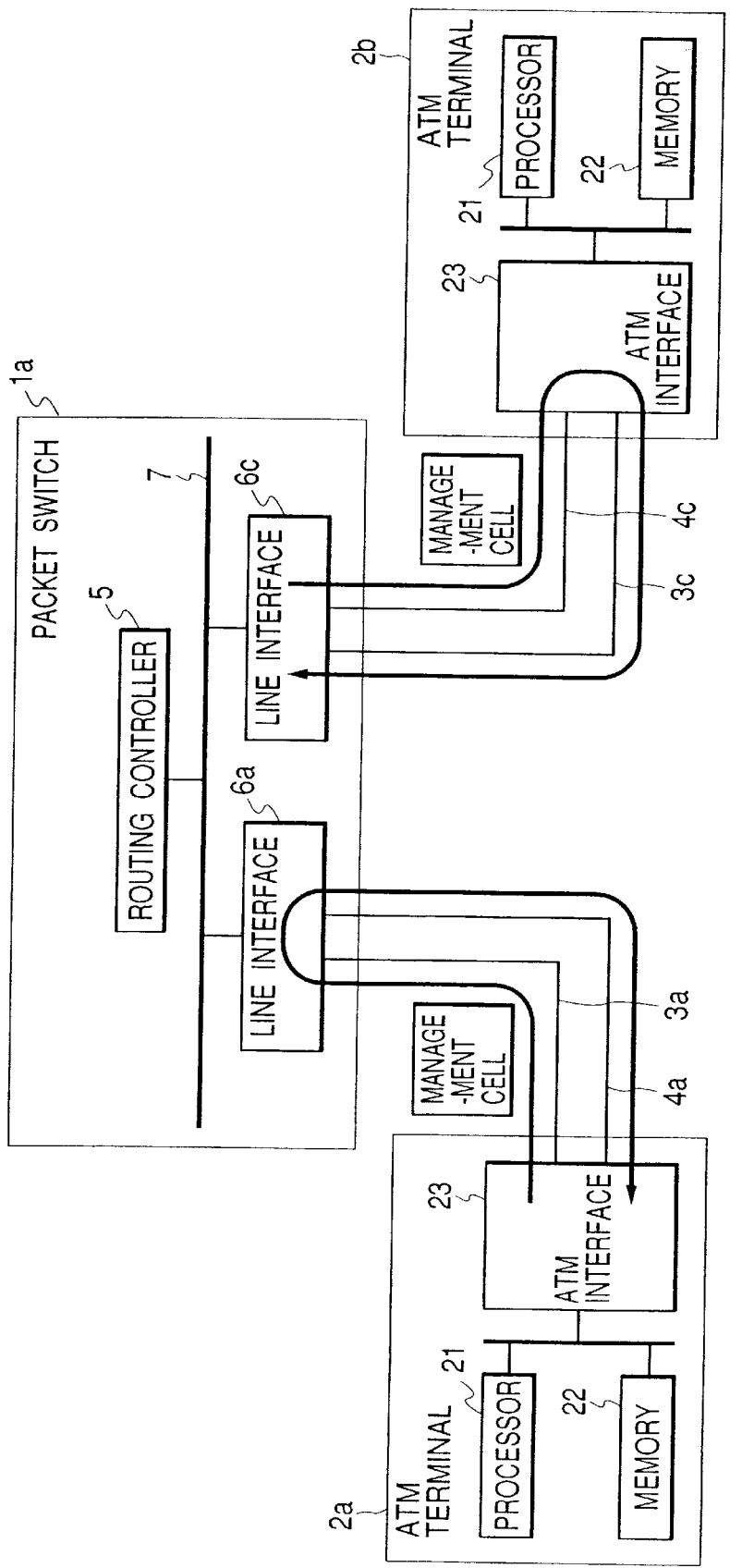
FIG. 10 is a diagram showing the flow of a management cell in the prior art packet switch.

If IP header of the received packet does not include an option area or if the value of the first byte of the option area is not 127, the received packet is a normal IP packet. In this case, like the transmission performed by the ATM interface 23 in a conventional ATM terminal, the processor 61 adds control information 130 and 135 having the format as shown in FIG. 4 to the head of the received packet on the basis of the IETF RFC1483. In addition, the processor 61 adds control information 201 to 204 of the AAL5 CPCS format as shown in FIG. 5 to the tail of the received packet (step 932), then divides the received packet thus modified in units of 48 bytes thereby to create ATM cell payloads (step 933). After this, the processor 61 searches the transmission VC table 68 based on the source IP address and the destination IP address of the received packet thereby to read out the output VPI/VCI 683 corresponding to the received packet and create an ATM header in the format as shown in FIG. 6, which includes the output VPI/VCI in its VPI/VCI field. The processor 61 then adds this created ATM header to each of the 48-byte payloads thereby to form transmission cells (step 935). Those transmission cells are written in the transmission cell buffer 63 one after another and transmitted to the ATM line 4c (step 940).

The processor 61 of the line interface 6c checks the termination flag 684 of the transmission table record 689 corresponding to the received packet during transmission of the transmission cells to the above ATM line 4c (step 940) thereby to judge if "1" is set in the element bit corresponding to the type of each management cell extracted from the management cell relay packet. Only the management cells for which "1" is set in the termination flag are transmitted to an output ATM line. Management cells for which "0" is set in the termination flag are terminated at this line interface 61.

Although only one packet switch is provided between source ATM terminal and destination ATM terminal in the above embodiment, a plurality of such the packet switches may be located between ATM terminals to realize the same management cell relay operation as the above, of course.

Although an IP option area is used to distinguish a management cell relay packet from a normal IP packet, an IP header protocol area may also be used for the same purpose. In such a case, the input line interface 6a assigns a specific value not used for the present standard protocol to the protocol area of the IP header of a management cell relay packet and checks if the IP header protocol area uses the above specific value for processing the last cell of a normal packet. If used, the processor 61 discards the packet. On the other hand, in the routing controller 5, the processor 51 may check the value of the protocol area of each received packet from an input line interface and transfers received IP packets to an output line interface if the protocol area has either a normal value or the above specific value. Otherwise, the processor 51 may discard received IP packets. In addition, the processor 51 of the output line interface 6c may check the protocol area of each received IP packet from the routing controller to treat received packets as management cell relay packets if the protocol area has the above specific value and as normal packets if the protocol area has another value.

Furthermore, although the AAL5 protocol that includes no first cell identifier of transmission packets in the ATM cell header is used in the above embodiments of the present invention, the other protocol that allows the uses of first cell identifier in the ATM cell header is also applicable to the present invention.

As described above, the packet switch of the present invention relays each management cell that an input line interface receives from an ATM line by identifying the cell whether to relay to an output line interface and insert it in a management cell relay packet together with data cells belonging to the same connection as that of the management cell if the management cell is determined to be relayed. Then, the routing controller transfers the management cell relay packet received from the input line interface to an output line interface according to the IP routing protocol. The output line interface then decomposes the management cell relay packet received from the routing controller to the original ATM cells (data cells and a management cell) before relaying the management cell to the destination unit.

Although the switch 1a relays a management cell transmitted from the ATM terminal 2a to the output ATM line 4c connected to the ATM terminal 2b together with data cells in the embodiments of the present invention, the same operation principle may apply to relay management cells received from the ATM terminal 2b connected to the input ATM line 3c in the format of the management cell relay packet to an ATM line connected to the ATM terminal. According to the present invention, therefore, a management cell transmitted from a source ATM terminal 2a can be looped back at the destination ATM terminal 2b to return to the same source ATM terminal as shown in FIG. 1. It is thus possible to know the state of an error or a congestion detected in the input ATM line 3a by the ATM terminal 2b or another ATM switch 1b connected to the output ATM line 4c or 4b. In the same way, it is possible for the source ATM terminal 2a or another ATM switch 1b, from which the management cell is transmitted, to know the state of an error or a congestion of the ATM line on the destination side.

What is claimed is:

1. A packet switch comprising:

plurality of line interfaces coupled with a pair of input and output ATM lines respectively; and a routing unit coupled with said line interfaces to relay an IP (Internet Protocol) packet received from one of said line interfaces to the other one of said line interfaces specified by the header information of the packet, wherein each of said line interfaces is configured to convert a group of ATM cells received from the input ATM line associated therewith to an IP packet to be transferred to said routing unit, to insert management cells received from said input ATM line into said IP packet to be transferred to said routing unit, and to convert an IP packet received from said routing unit to a group of ATM cells to be transmitted to the output ATM line associated therewith, wherein each of said line interfaces is configured to insert said management cells into one of IP packets which includes a string of data cells belonging to the same connection as that of said management cell, and wherein each of said line interfaces includes a memory for specifying the type of management cells to be relayed to one of the other line interfaces in corresponding to respective connections on the input ATM line associated therewith so that predetermined type of management cells specified by said memory are selectively inserted into said IP packet.

2. A packet switch comprising:

a plurality of line interfaces coupled with a pair of input and output ATM lines respectively; and a routing unit coupled with said line interfaces to relay an IP (Internet Protocol) packet received from one of said line interfaces to the other one of said line interfaces specified by the header information of the packet, wherein each of said line interfaces is configured to convert a group of ATM cells received from the input ATM line associated therewith to an IP packet to be transferred to said routing unit, to insert management cells received from said input ATM line into said IP packet to be transferred to said routing unit, and to convert an IP packet received from said routing unit to a group of ATM cells to be transmitted to the output ATM line associated therewith, wherein each of said line interfaces is configured to insert said management cells into one of IP packets which includes a string of data cells belonging to the same connection as that of said management cell, and wherein said IP packet to which said management cell is inserted comprises a packet header and an information field in which said management cell and a group of data cells are arranged in the order of arriving at the line interface.

3. A packet switch according to claim 2, wherein said IP packet to which said management cell is inserted includes a series of data cells from the first cell to the last cells of an original data packet identified by the header information of each ATM cell.

* * * * *